(12) United States Patent
Bickham et al.

(10) Patent No.: US 8,315,495 B2
(45) Date of Patent: *Nov. 20, 2012

(54) LARGE EFFECTIVE AREA FIBER WITH GE-FREE CORE

(75) Inventors: Scott Robertson Bickham, Corning, NY (US); Dana Craig Bookbinder, Corning, NY (US); Ming-Jun Li, Horseheads, NY (US); Snigdharaj Kumar Mishra, Wilmington, NC (US); Daniel Aloysius Nolan, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 408 days.

This patent is subject to a terminal disclaimer.

(21) Appl. No.: 12/696,189

(22) Filed: Jan. 29, 2010

(65) Prior Publication Data

US 2010/0195966 A1 Aug. 5, 2010

Related U.S. Application Data

(63) Continuation-in-part of application No. 12/362,694, filed on Jan. 30, 2009, now Pat. No. 7,689,085.

(51) Int. Cl.
*G02B 6/036* (2006.01)

(52) U.S. Cl. ........................ 385/128; 385/127

(58) Field of Classification Search ........... 385/123–128
See application file for complete search history.

(56) References Cited

U.S. PATENT DOCUMENTS 4,082,420 A 4/1978 Shiraishi et al. ........... 350/96.31
(Continued)

FOREIGN PATENT DOCUMENTS

EP 1978383 10/2008
(Continued)

OTHER PUBLICATIONS

Single-Mode Fiber Optics; Principles and Applications; Second Edition, Revised and Expanded; Luc B. Jeuhomme; Photonetics; Marcel Dekker, New York 1990; pp. 39-44.

*Primary Examiner* — Kevin S Wood
(74) *Attorney, Agent, or Firm* — Svetlana Z. Short

(57) ABSTRACT

According to some embodiments an optical waveguide fiber comprises:

(i) a Ge free core having an effective area of 90 $\mu m^2$ to 160 $\mu m^2$, at a 1550 nm wavelength, and α value $12 \leq \alpha \leq 25$, said core comprising:

(a) a central core region extending radially outwardly from a centerline to a radius $0 \ \mu m \leq r_0 \leq 2 \ \mu m$, and having a relative refractive index percent profile $\Delta_0(r)$ in % measured relative to pure silica, wherein $-0.1\% \leq \Delta_0(r) \leq 0.1\%$, wherein the central core region has a maximum relative refractive index percent, $\Delta_{0MAX}$;

(b) a first annular core region surrounding and directly adjacent to the central core region and extending to an outer radius $r_1$, wherein $4.8 \ \mu m \leq r_1 \leq 10 \ \mu m$, and having a relative refractive index percent profile, $\Delta_1(r)$ in % measured relative to pure silica, and a minimum relative refractive index, $\Delta_{2MIN}$, and the relative refractive index measured at a radius $r=2.5 \ \mu m$ being:

$-0.15 \leq \Delta_1(r=2.5 \ \mu m) \leq 0$, and $\Delta_{0MAX} \geq \Delta_1(r=2.5 \ \mu m)$;

(c) a fluorine doped second annular region surrounding and directly adjacent to the first annular core region and extending to a radius $13 \ \mu m \leq r_2 \leq 30 \ \mu m$ and having a negative relative refractive index percent profile, $\Delta_2(r)$ in %, measured relative to pure silica, with a minimum relative refractive index percent $\Delta_{2MIN}$ being:

$\Delta_{2MIN} \leq \Delta_1(r=2.5 \ \mu m)$, and $-0.7\% \leq \Delta_{2MIN} \leq -0.28\%$;

(ii) a cladding surrounding the core and having a relative refractive index percent $\Delta_c(r)$ in % measured relative to pure silica, and $\Delta_c(r) = \Delta_{2MIN} \pm 0.3\%$;

wherein the relative refractive index profile of the optical fiber is selected to provide attenuation of no more than 0.175 dB/km at the wavelength of 1550 nm.

34 Claims, 10 Drawing Sheets

U.S. PATENT DOCUMENTS

| | | | |
|---|---|---|---|
| 4,690,504 A | 9/1987 | Yokokawa et al. | 350/96.34 |
| 4,735,475 A | 4/1988 | Watanabe et al. | 350/96.34 |
| 4,802,733 A | 2/1989 | Bachmann et al. | 350/96.34 |
| 4,838,643 A | 6/1989 | Hodges et al. | 350/96.33 |
| 5,146,534 A | 9/1992 | Lines | 385/142 |
| 5,335,306 A | 8/1994 | Takita et al. | 385/142 |
| 6,153,546 A | 11/2000 | Saitoh et al. | 501/37 |
| 6,289,161 B1 | 9/2001 | Schotz et al. | 385/142 |
| 6,449,415 B1 | 9/2002 | Sasaoka | 385/123 |
| 6,600,862 B2 | 7/2003 | Mukasa | 385/124 |
| 6,658,190 B2 | 12/2003 | Hirano et al. | 385/124 |
| 6,754,423 B2 | 6/2004 | Simons et al. | 385/126 |
| 7,088,900 B1 | 8/2006 | Mishra | 385/142 |
| 2003/0063880 A1 | 4/2003 | Koumura et al. | 385/127 |
| 2004/0200240 A1 | 10/2004 | Abe et al. | 65/397 |
| 2008/0279517 A1 | 11/2008 | Bickham et al. | 385/124 |

FOREIGN PATENT DOCUMENTS

| | | |
|---|---|---|
| WO | 2007/061561 | 5/2007 |
| WO | 2008/024255 | 2/2008 |
| WO | 2010/088482 | 8/2010 |

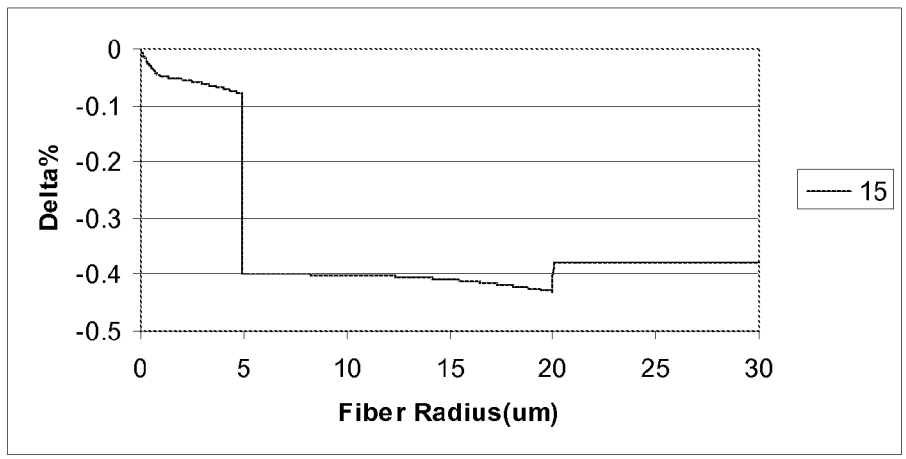
Fig. 16
Fig. 17
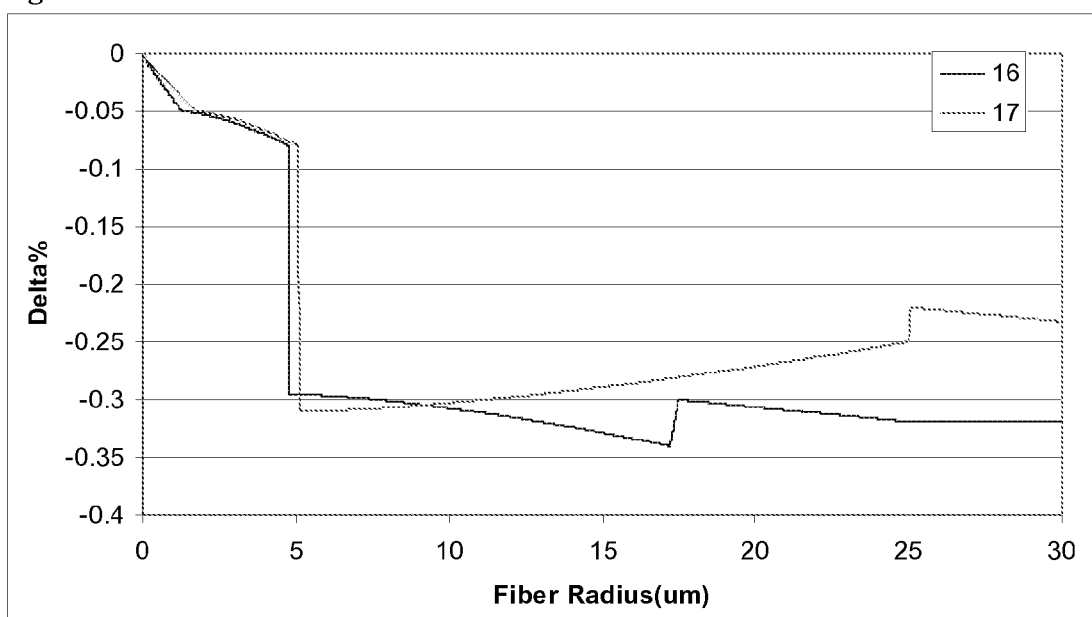

LARGE EFFECTIVE AREA FIBER WITH GE-FREE CORE

CROSS-REFERENCE TO RELATED APPLICATIONS

This is a continuation-in-part of U.S. patent application Ser. No. 12/362,694 filed on Jan. 30, 2009 now U.S. Pat. No. 7,689,085, the content of which is relied upon and incorporated herein by reference in its entirety, and the benefit of priority under 35 U.S.C. §120 is hereby claimed.

FIELD OF THE INVENTION

The present invention relates generally to optical fibers, and particularly to large effective area optical fibers with pure silica core and low attenuation.

TECHNICAL BACKGROUND

Optical amplifier technology and wavelength division multiplexing techniques are typically required in telecommunication systems that provide high power transmissions for long distances. The definition of high power and long distances is meaningful only in the context of a particular telecommunication system wherein a bit rate, a bit error rate, a multiplexing scheme, and perhaps optical amplifiers are specified. There are additional factors, known to those skilled in the art, which have impacted upon the definition of high power and long distance. However, for most purposes, high power is an optical power greater than about 10 mW. High power systems often suffer from non-linear optical effects, including self-phase modulation, four-wave-mixing, cross-phase modulation, and non-linear scattering processes, all of which can cause degradation of signals in high powered systems. In some applications, single power levels of 1 mW or less are still sensitive to non-linear effects, so non-linear effects may still be an important consideration in such lower power systems. In addition, other optical fiber attributes, such as attenuation, are a major contributing factor to the degradation of the signal.

Generally, an optical waveguide fiber having a large effective area ($A_{eff}$) reduces non-linear optical effects, including self-phase modulation, four-wave-mixing, cross-phase modulation, and non-linear scattering processes, all of which can cause degradation of signals in high powered systems.

On the other hand, an increase in effective area of an optical waveguide fiber typically results in an increase in macrobending induced losses which attenuate signal transmission through a fiber. The macrobending losses become increasingly significant over long (e.g., 100 km, or more) distances (or spacing between regenerators, amplifiers, transmitters and/or receivers. Unfortunately, the larger the effective area of a conventional optical fiber is, the higher the macrobend induced losses tend to be. Further more, attenuation can be a major contributing factor to the degradation of the signal in large effective area fibers.

SUMMARY

One embodiment of the invention is an optical waveguide fiber comprising:
(i) a Ge free core having an effective area of about 90 $\mu m^2$ to about 160 $\mu m^2$, at a 1550 nm wavelength, and α value $12 \leq \alpha \leq 200$, said core comprising:
(a) a central core region extending radially outwardly from a centerline to a radius $r_0$, and having a relative refractive index percent profile $\Delta_0(r)$ in % measured relative to pure silica, wherein the central core region has a maximum relative refractive index percent, $\Delta_{0MAX}$;
(b) a first annular core region surrounding and directly adjacent to the central core region and extending to an outer radius $r_1$, wherein 4.8 $\mu m \leq r_1 \leq 10$ $\mu m$, and having a relative refractive index percent profile, $\Delta_1(r)$ in % measured relative to pure silica, and a minimum relative refractive index, $\Delta_{2MIN}$, and the relative refractive index measured at a radius $r=2.5$ $\mu m$ being:

$-0.15 \leq \Delta_1(r=2.5 \mu m) \leq 0$ and $\Delta_{0MAX} \geq \Delta_1(r=2.5 \mu m)$;

(c) a fluorine doped second annular region surrounding and directly adjacent to the first annular core region and extending to a radius 13 $\mu m \leq r_2 \leq 30$ $\mu m$ and having a negative relative refractive index percent profile, $\Delta_2(r)$ in %, measured relative to pure silica,
with a minimum relative refractive index percent $\Delta_{2MIN}$ being:

$\Delta_{2MIN} < \Delta_1(r=2.5 \mu m)$ and $-0.7\% \leq \Delta_{2MIN} \leq -0.28\%$;

(ii) a cladding surrounding the core and having a relative refractive index percent $\Delta_3$ (r) in % measured relative to pure silica,
wherein the relative refractive index profile of the optical fiber is selected to provide attenuation less than 0.175 dB/km at the 1550 nm wavelength.

Preferably, according to embodiments described herein, $\Delta_3$ (r) $\geq \Delta_{2MIN}$. In some embodiments, $\Delta_3$ (r)=$\Delta_{2MIN} \pm 0.3\%$. Also, according to at least some embodiments 0 $\mu m \leq r_0 \leq 2$ $\mu m$.

According to some exemplary embodiments, at least a portion of the central core region is made of pure silica.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIGS. 2-19 illustrate refractive index profiles of exemplary embodiments of the optical fibers of the present invention;

DETAILED DESCRIPTION

Definitions

Figure 1A:
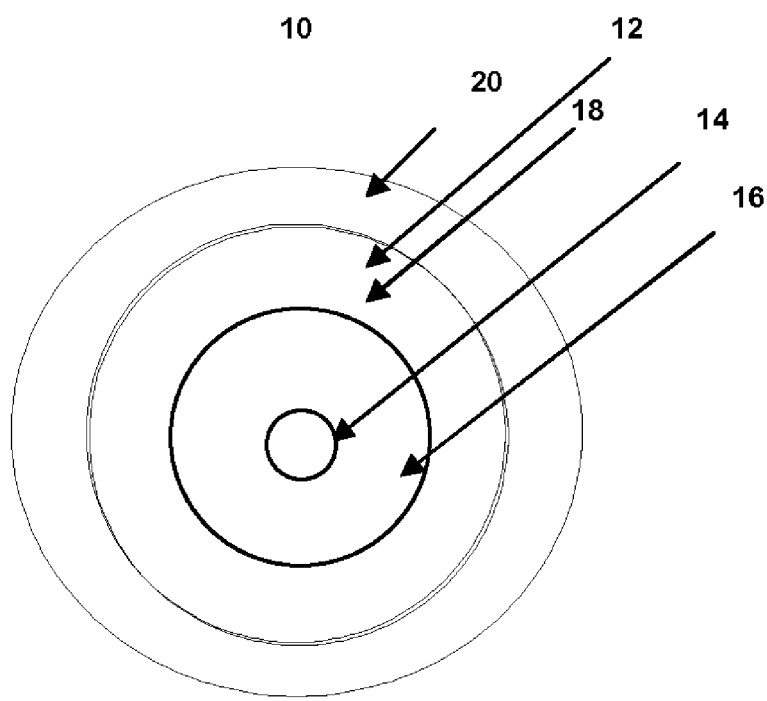
FIG. 1A is a cross-sectional view of one embodiment of the present invention.

The "refractive index profile" is the relationship between refractive index or relative refractive index and waveguide fiber radius.

The "relative refractive index percent" is defined as $\Delta\% = 100 \times (n(r)^2 - n_s^2)/2n(r)^2$, where $n(r)$ refractive index at the radial distance r from the fiber's centerline, unless otherwise specified, and $n_s$ is the refractive index of silica at a wavelength of 1550 nm. As used herein, the relative refractive index is represented by $\Delta$ and its values are given in units of "%", unless otherwise specified. In cases where the refractive index of a region is less than that of silica, the relative index percent is negative and is referred to as having a depressed index, and is calculated at the point at which the relative index is most negative unless otherwise specified. In cases where the refractive index of a region is greater than the refractive index silica, the relative index percent is positive and the region can be said to be raised or to have a positive index, and is calculated at the point at which the relative index is most positive, unless otherwise specified. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion values in a two-moded regime assume intermodal dispersion is zero. The zero dispersion wavelength ($\lambda_0$) is the wavelength at which the dispersion has a value of zero. Dispersion slope is the rate of change of dispersion with respect to wavelength.

"Effective area" is defined as: $A_{eff} = 2\pi (\int f^2 r)^2/(\int f^4 r dr)$ where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" refers to a relative refractive index profile, expressed in terms of $\Delta(r)$ which is in units of "%", where r is the radius, which follows the equation, $\Delta(r) = \Delta(r_o)(1 - [|r - r_o|/(r_1 - r_o)]^\alpha)$ where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Petermann II method wherein, $2w = $ MFD, and $w^2 = (2\int f^2 r dr / \int [df/dr]^2 r dr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load wire mesh (LLWM) attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement (when using the multimode reference technique), i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cable cutoff" is typically lower than the measured fiber cutoff due to higher levels of bending and mechanical pressure in the cable environment. The actual cabled cutoff condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cable cutoff measurement is described in EIA-455-170 Cable Cutoff Wavelength of Single-mode Fiber by Transmitted Power, or "FOTP-170" Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically connected to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Embodiment(s) of the invention

Figure 1B:
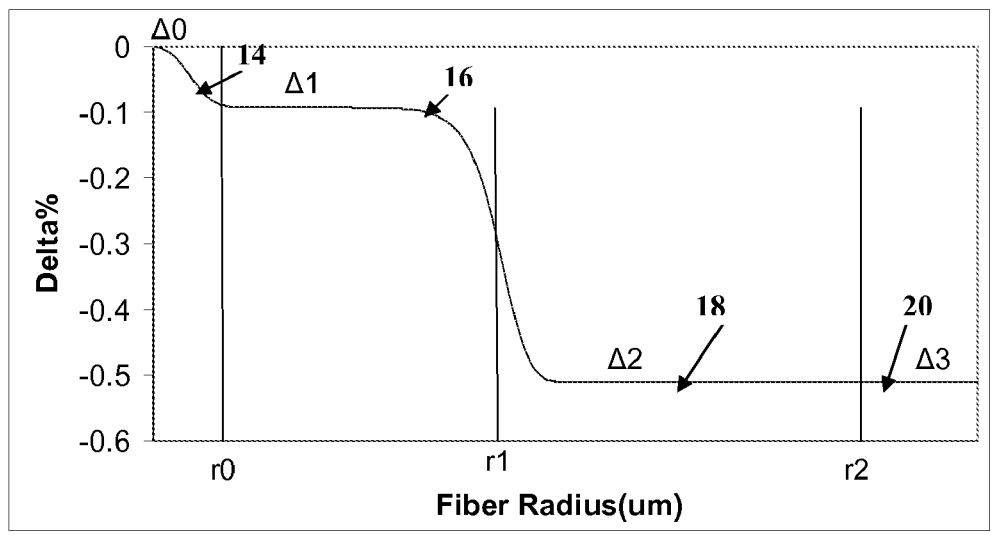
FIG. 1B illustrates schematically an exemplary refractive index profile of the fiber of FIG. 1A.
Figure 2:
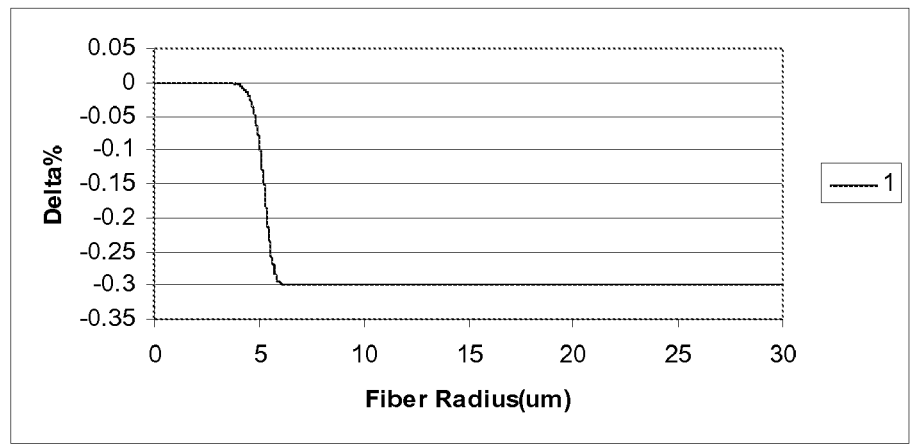
Figure 3:
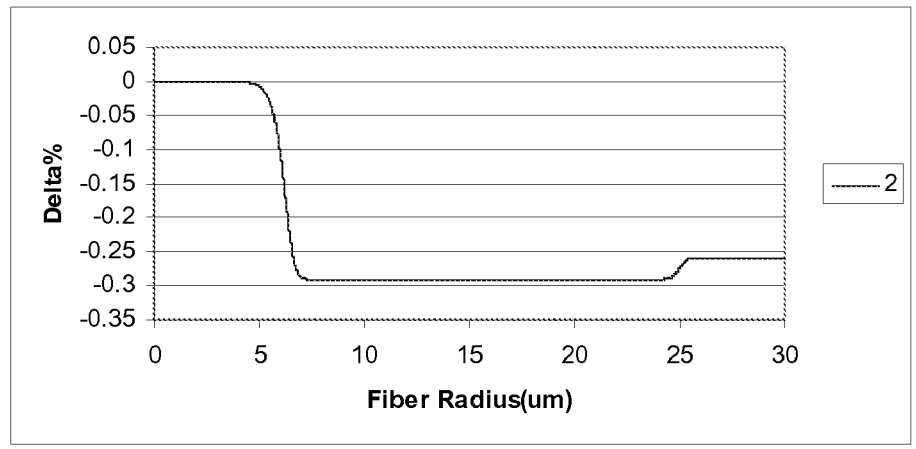
Figure 4:
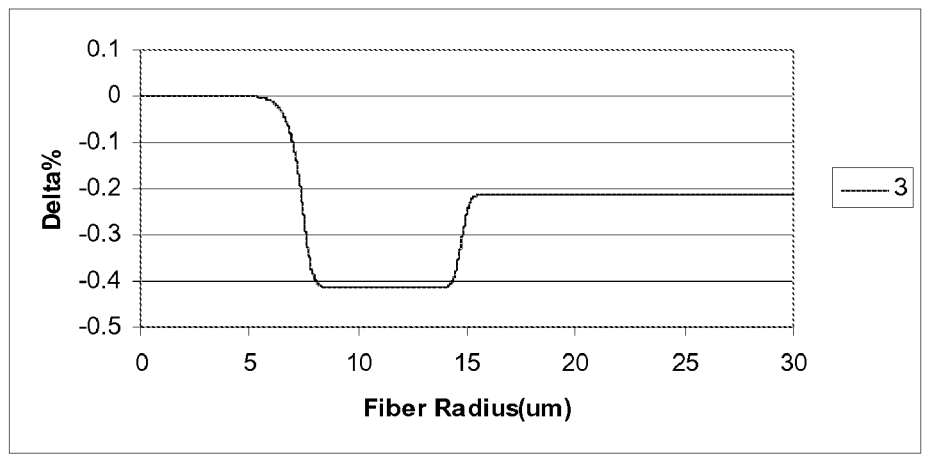
Figure 5:
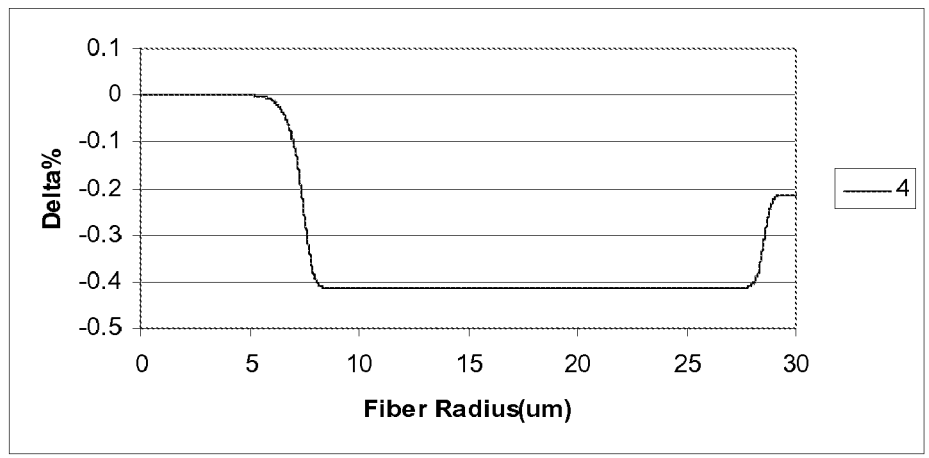
Figure 6:
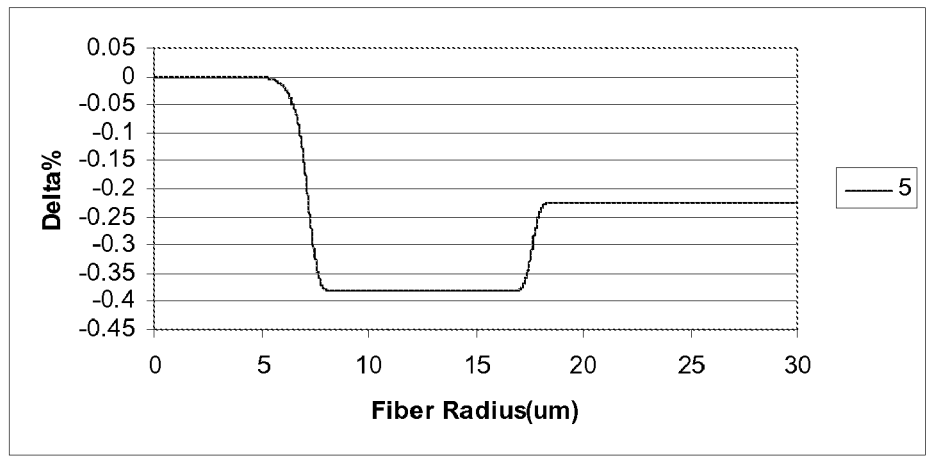
Figure 7:
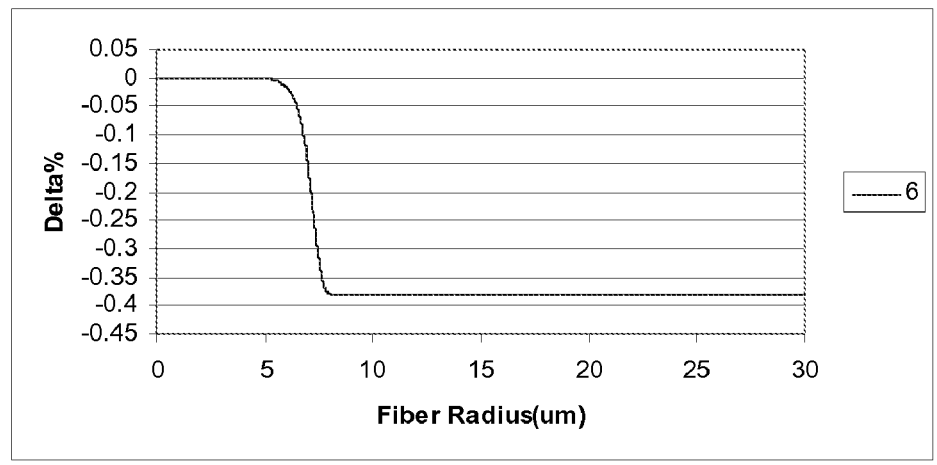
Figure 8:
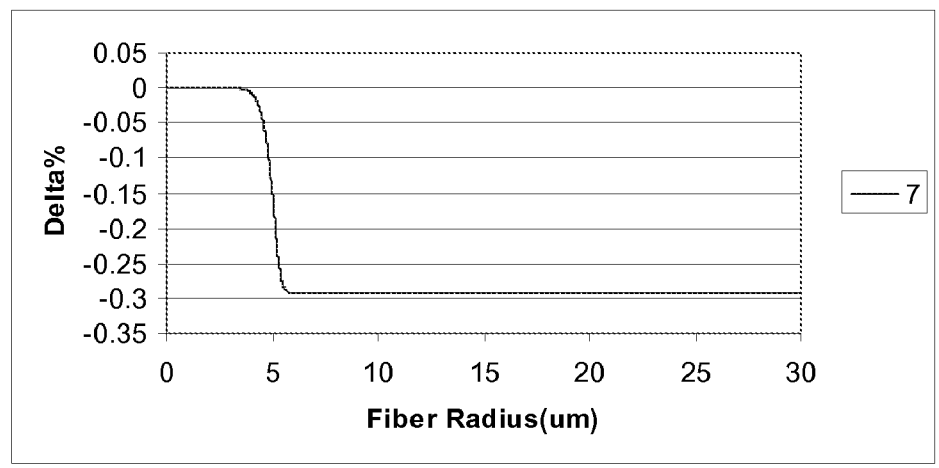
Figure 9:
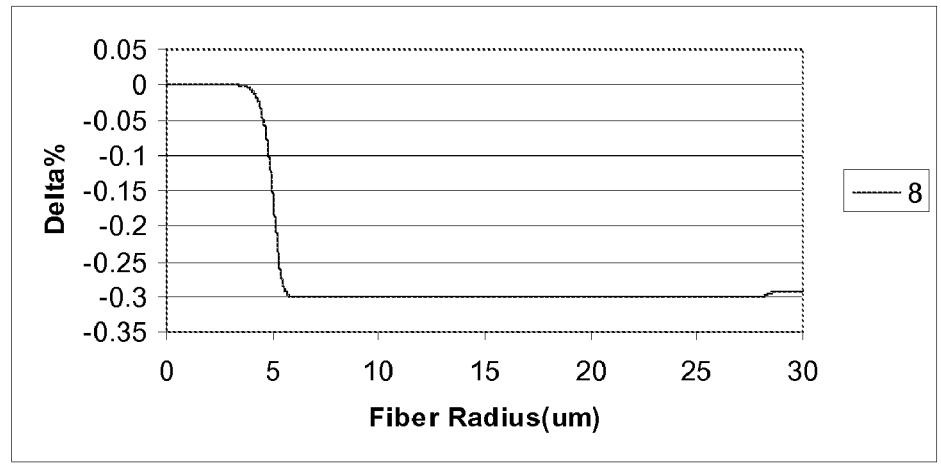
Figure 10:
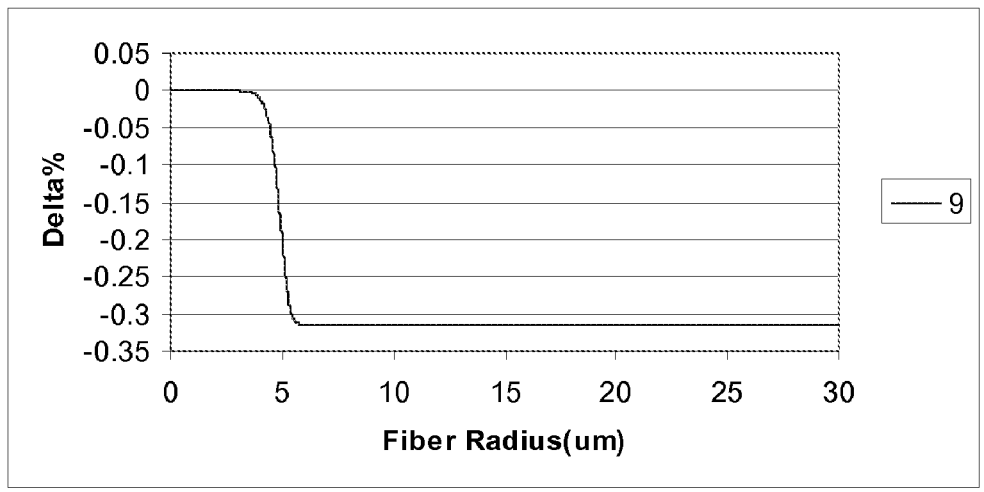
Figure 11:
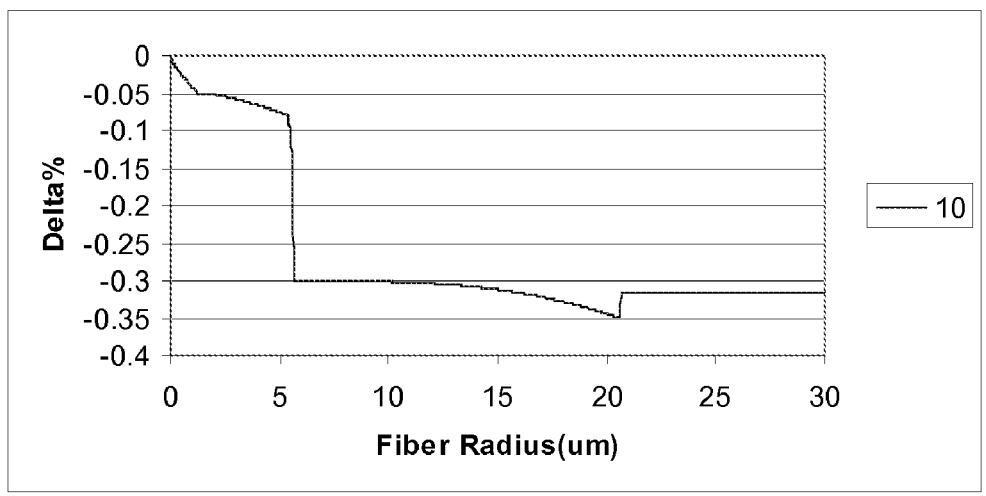
Figure 12:
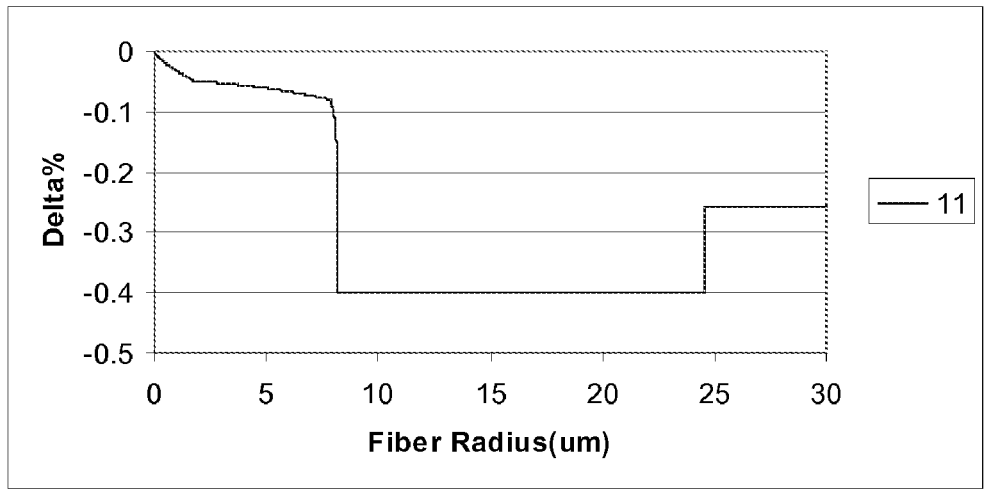
Figure 13:
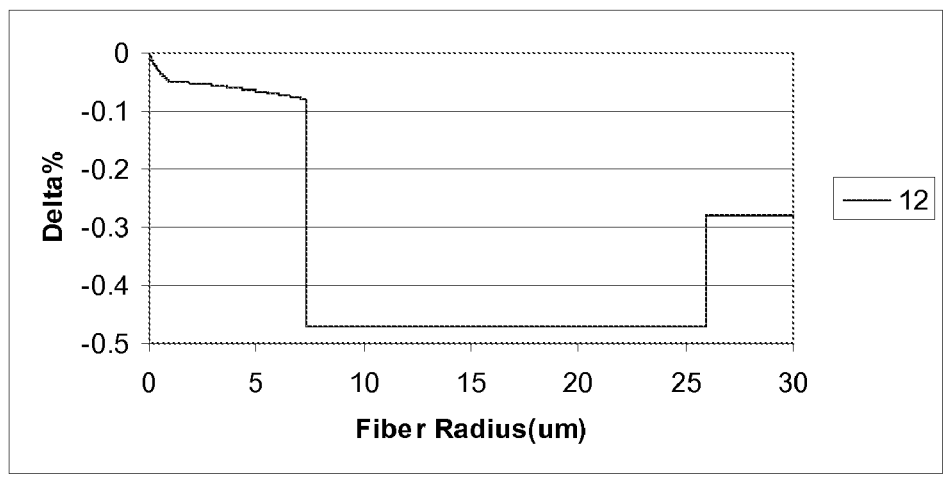
Figure 14:
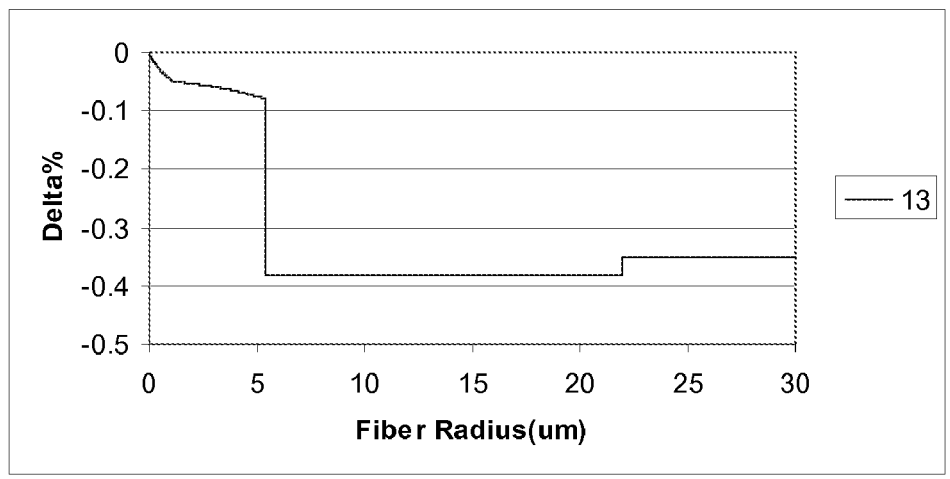
Figure 15:
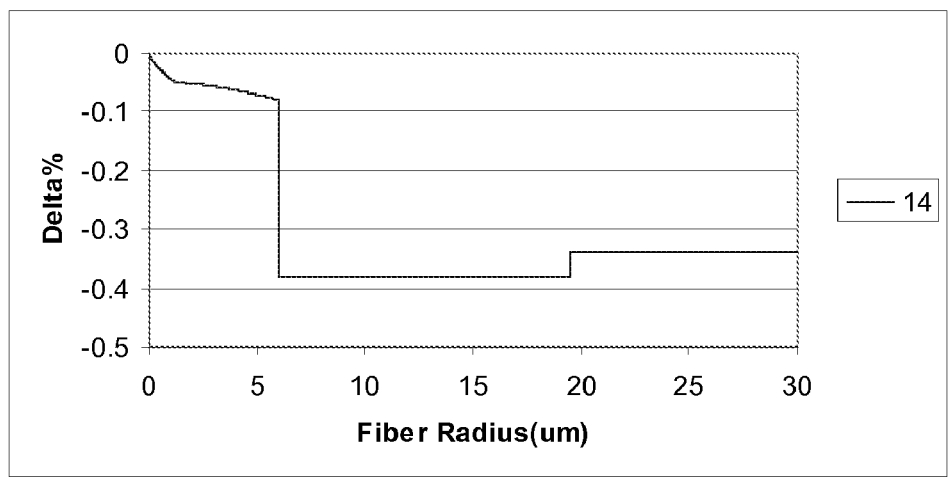

Reference will now be made in detail to the present embodiment(s) of the invention, examples of which are illustrated in the accompanying drawings. Whenever possible, the same reference numerals will be used throughout the drawings to refer to the same or like parts. One embodiment of the optical fiber of the present invention is shown in FIG. 1A, and is designated generally throughout by the reference numeral 10. The waveguide fiber 10 includes a core 12 having an effective area of at about 90 $\mu m^2$ or more at a 1550 nm wavelength (for example 90 $\mu m^2$ to 160 $\mu m^2$, or 100 $\mu m^2$ to 160 $\mu m^2$, or 120 to 140 $\mu m^2$ at a 1550 nm wavelength), and α value $12 \leq \alpha \leq 200$ (for example $12 \leq \alpha \leq 100$, or $12 \leq \alpha \leq 25$), and a cladding 20 surrounding the core. A typical range of α values in the exemplary fibers described herein is 14 to 20, for example $15 \leq \alpha \leq 17$. However, larger α values (e.g., >25) can be achieved by plasma chemical vapor deposition (PCVD). The exemplary refractive index profile (relative refractive index delta, vs. radius) of this fiber shown schematically in FIG. 1B.

The core 12 is Ge free and comprises a central core region 14, a first annular core region 16 surrounding and directly adjacent to the central core region 14, and a second annular region 18 surrounding and directly adjacent to the first annular region 16. The central core region 14 extends radially outwardly from a centerline to a radius 0 $\mu m \leq r_0 \leq 2$ $\mu m$, and has a relative refractive index percent profile $\Delta_0(r)$ measured in % relative to pure silica, wherein $-0.1\% \leq \Delta_0(r) \leq 0.15$. In some embodiments, $-0.1\% \leq \Delta_0(r) \leq 0.1\%$. In some embodiments, $-0.1\% \leq \Delta_0(r) \leq 0\%$. For example, in some embodiments, $-0.075\% \leq \Delta_0(r) \leq 0\%$. The central core region 14 also has a maximum relative refractive index percent, $\Delta_{0MAX}$. In the exemplary embodiments described herein, $\Delta_{0MAX}$ occurs at the centerline of the fiber (r=0).

The first annular core region 16 extends to an outer radius $r_1$, wherein 4.8 $\mu m \leq r_1 \leq 10$ $\mu m$, and having a relative refractive index percent profile, $\Delta_1(r)$ in % measured relative to pure silica, and a minimum relative refractive index, $\Delta_{1MIN}$, a maximum relative refractive index $\Delta_{1MAX}$, (where $\Delta_{0MAX} \geq \Delta_{1MAX}$), and the relative refractive index $\Delta_1$ measured at a radius r=2.5 $\mu m$ being: (a) $-0.15 \leq \Delta_1(r=2.5 \mu m) \leq 0$, and (b) $\Delta_{0MAX} \geq \Delta_1(r=2.5 \mu m)$. In some embodiments $\Delta_{1MAX} = \Delta_1(r=2.5 \mu m)$.

The second annular core region 18 is fluorine doped, and it surrounds and is directly adjacent to the first annular region 16. Typically, according to the embodiments described herein, second annular core region 18 has 0.1 to 2 wt % fluorine, e.g., 0.1 to 1.6 wt %, or 0.4% to 2 wt % fluorine.

The second annular core region 18 extends to a radius $r_2$, where 13 $\mu m \leq r_2 \leq 30$ $\mu m$ and has a negative relative refractive index percent profile, $\Delta_2(r)$ in %, measured relative to pure silica, with a minimum relative refractive index percent $\Delta_{2MIN}$ being: (a) $\Delta_{2MIN} < \Delta_1(r=2.5 \mu m)$ and/or $\Delta_{2MIN} < \Delta_{1MAX}$, and (b) $-0.7\% \leq \Delta_{2MIN} \leq -0.27\%$. $\Delta_2(r)$ also has a maximum relative refractive index percent $\Delta_{2MAX}$ wherein $\Delta_{2MAX} < \Delta_1$ (r=2.5 $\mu m$) and $\Delta_{2MAX} \geq \Delta_{2MIN}$. In some embodiments $-0.5\% < \Delta_{2MIN} < -0.27\%$. For example, $\Delta_{2MIN}$ may be $-0.29\%$, $-0.3\%$, $-0.35\%$, $-0.38\%$. For example, $\Delta_{2MIN}$ may be $-0.29\%$, $-0.3\%$, $-0.35\%$, $-0.38\%$, $-0.4\%$, $-0.47\%$, $-0.5\%$, or any number there between. In other embodiments, $-0.4\% < \Delta_{2MIN} < -0.27\%$.

It is noted that in cases where second annular core region 18 has a relatively flat refractive index profile, $\Delta_{2MAX} - \Delta_{2MIN} < 0.03\%$, the radius $r_1$ is defined to correspond to the mid point value between $\Delta_1(r=2.5 \mu m)$ and the first instant when the second annular region reaches $\Delta_{2MIN}$. That is $r_1=$ is a radius at which the $\Delta(r)=[\Delta_1(r=2.5 \mu m)+\Delta_{2MIN}]/2$. Similarly, the outer radius $r_2$ of the annular core region 18 is defined to correspond to the mid point value between $\Delta_{2MIN}$ and the first instance where $\Delta_3=\Delta_{3MAX}$. That is, $r_2=$ is a radius at which the $\Delta(r)=[\Delta_{2MIN}+\Delta_{3MAX}]/2$. In cases where second annular core region 18 does not have a relatively flat refractive index profile, i.e. $\Delta_{2MAX}-\Delta_{2MIN} \geq 0.03\%$, and where such that $\Delta_2$ reaches its $\Delta_{2MIN}$ nearer the cladding, the radius $r_1$ is defined to correspond to the mid point value between $\Delta_1(r=2.5 \mu m)$ and the first instant when the second annular region reaches $\Delta_{2MAX}$. That is $r_1=$ is a radius at which the $\Delta(r)=[\Delta_1(r=2.5 \mu m)+\Delta_{MAX}]/2$. The radius $r_2$ is still defined to correspond to the mid point value between $\Delta_{2MIN}$ and the first instant when the second annular region reaches $\Delta_{3MAX}$, that is $r_2=$ is a radius at which the $\Delta(r)=[\Delta_{2MIN}+\Delta_{3MAX}]/2$.

In some embodiments the ratio $r_2/r_1$ is between 2 and 6. Preferably the ratio $2.1 \leq r_2/r_1 \leq 5.75$, for example $2.15 \leq r_2/r_1 \leq 5.7$. Preferably $r_2 \leq 30$ $\mu m$, for example 14 $\mu m \leq r_2 \leq 29$ $\mu m$. For a given $\Delta_2$ and $\Delta_3$, if the ratio $r_2/r_1$ is small (e.g., because $r_1$ is large), the MFD becomes large, $\lambda_0$ becomes small, and dispersion D at 1550 nm becomes large. If the $r_2/r_1$ ratio is too large, the MFD can become too small, $\lambda_0$ moves to higher wavelengths, and dispersion D at 1550 nm can become small.

The cladding 20 surrounds the core 12 and has a relative refractive index percent, $\Delta_3$ (r) in %, measured relative to pure silica, and $\Delta_3(r) \leq \Delta_{2MIN}$ In some exemplary embodiments the core 12 and the cladding 20, include F as a downdopant. In these embodiments the F amount present in the first and second annular core regions 16 and 18 is greater than the amount of fluorine present in the central core region 14. In some exemplary embodiments the core 12 also includes at least one alkali metal oxide dopant, for example, where in the alkali is K, Na, Li, Cs, and, Rb. In some exemplary embodiments the core 12 contains $K_2O$ in the amounts of 20 ppm to 1000 ppm by weight of K. Fiber 10 may also include chlorine. It is preferable that the amount of chlorine is greater than 500 ppm by wt in the core 12, and greater than 10000 ppm by wt in the cladding 20. It is noted that the term "ppm", unless otherwise specially noted otherwise, refers to parts per million by weight, or ppm by weight, and a measurement on wt % can be converted to ppm by multiplying by a factor of 10,000.

The relative refractive index profile of the optical fiber 10 is selected to provide attenuation of no more than 0.175 dB/km at the wavelength λ of 1550 nm, for example 0.145 dB/km to 0.175 dB/km at the wavelength λ of 1550 nm. The attenuation values can be, 0.145 dB/km to 0.17 dB/km or 0.15 dB/km to 0.165 dB/km, or, for example, 0.15 dB/km, 0.155 dB/km, 0.16 dB/km, 0.165 dB/km, 0.165 dB/km, or 0.17 dB/km at the wavelength λ of 1550 nm.

EXAMPLES 1-15

The invention will be further clarified by the following examples.

Tables 1-2 list characteristics of Examples 1-15 of one illustrative set of fiber embodiments. FIGS. 2-16 show the refractive index profiles corresponding to Examples 1-15, respectively. In these optical fiber embodiments of Examples 1-15, $-0.5\% \leq \Delta_0 = \leq 0\%$ and $\Delta_{0max} = \leq 0\%$; $-0.065\% \leq \Delta_1$ ($r=2.5$ μm)$\leq 0\%$, $-0.065\% \leq \Delta_{1max} \leq 0.0\%$, $-0.5\% \leq \Delta_{2MIN} \leq -0.27\%$, $-0.4\% \leq \Delta_3 \leq -0.2\%$, and $r_2/r_1$ is $2.17 \leq r_2/r_1 \leq 5.7$ and $r_2 < 30$. However, it is noted that in other embodiments $\Delta_0$ may be somewhat larger or smaller than 0% (relative to silica), depending on whether updopants or downdopants are present in the center core region 14. Although some embodiments of the optical fibers 10 have alpha values between 12 and 25, optical fiber embodiments of Examples 1-9 have alpha values in the range of 13-15. Optical fiber embodiments of Examples 10-15 have alpha values of about 20.

The modeled profile parameters of these exemplary fibers are summarized in Table 1A. The values for $r_3$ correspond to the outer diameter of the cladding, and in these examples $r_3$ was 62.5 μm. In some exemplary fibers $\Delta_2(\%) = \Delta_3(\%)$. Thus, because in these embodiments there is no obvious index change between the annular core regions 16 and 18, the $r_2$ value is provided as being within a specified range.

transition between core regions 14 and 16, although Table 1 specifies that $r_0$ is 0 μm, we could have also specified that $r_0=2$ μm. In these exemplary fibers the $\Delta_{0MAX}$ is 0, because the core region 14 (and at least a portion of the first annular region 16) is pure silica.

More specifically, the optical fiber embodiments corresponding to the Examples 2-5 of Table 1 (see FIGS. 3-6) include of a core refractive index profile with a central segment 14 surrounded by the first annular core region 16 having a refractive index $\Delta_0 = \Delta_1$, which in turn is surrounded by a moat region corresponding to the second annular core region 18 with refractive index $\Delta_{2MIN}$. This moat (second annular core region 18) is surrounded by the cladding 20 having refractive index $\Delta_3 > \Delta_{2MIN}$. In the optical fiber embodiments corresponding to the Examples 1-5, $-0.38\% \leq \Delta_3 \leq -0.26\%$; $-0.412\% \leq \Delta_2 \leq -0.290\%$.

The optical fiber embodiments corresponding to the Examples 6-9 of Table 1 include a core refractive index profile with a pure silica central core region 14 surrounded by the first (pure silica) annular core region 16 having a relative refractive index $\Delta_0 = \Delta_1 = 0$. In these exemplary fibers the first annular core region 16 is surrounded by the second annular core region 18 with a relative refractive index $\Delta_2 < \Delta_1$. The

TABLE 1

| Example | $\Delta_{0MAX}$ (%) | $r_0$ (um) | $\Delta_{1MAX}$ (%) | $r_1$ (um) | $\Delta_{2Max}$ (%) | $r_2$ (um) | $\Delta_3$ (%) | $r_2/r_1$ |
|---|---|---|---|---|---|---|---|---|
| 1 | 0 | 0 | 0.000 | 5.25 | −0.300 | 15-26 | −0.300 | 2.86-4.95 |
| 2 | 0 | 0 | 0.000 | 6.20 | −0.290 | 25 | −0.260 | 4.03 |
| 3 | 0 | 0 | 0.000 | 7.38 | −0.412 | 16 | −0.213 | 2.17 |
| 4 | 0 | 0 | 0.000 | 7.38 | −0.412 | 28 | −0.213 | 3.80 |
| 5 | 0 | 0 | 0.000 | 7.10 | −0.382 | 18 | −0.225 | 2.54 |
| 6 | 0 | 0 | 0.000 | 7.10 | −0.382 | 16-26 | −0.382 | 2.25-3.66 |
| 7 | 0 | 0 | 0.000 | 5.00 | −0.292 | 16-26 | −0.292 | 3.20-5.20 |
| 8 | 0 | 0 | 0.000 | 5.00 | −0.302 | 28.5 | −0.292 | 5.70 |
| 9 | 0 | 0 | 0.000 | 4.90 | −0.315 | 16-26 | −0.315 | 3.26-5.31 |
| 10 | 0 | 1.40 | −0.064 | 5.63 | −0.301 | 20.5 | −0.315 | 3.64 |
| 11 | 0 | 1.92 | −0.062 | 8.15 | −0.400 | 24.8 | −0.260 | 3.04 |
| 12 | 0 | 1.12 | −0.062 | 7.40 | −0.470 | 26 | −0.280 | 3.51 |
| 13 | 0 | 1.30 | −0.062 | 5.60 | −0.380 | 22 | −0.350 | 3.93 |
| 14 | 0 | 1.40 | −0.063 | 6.20 | −0.380 | 19.6 | −0.340 | 3.16 |
| 15 | 0 | 1.00 | −0.061 | 5.00 | −0.401 | 20 | −0.380 | 4.00 |

In these 15 exemplary embodiments the cores 12 are silica based ($SiO_2$), and are doped with fluorine. The following table provide fluorine, F, amounts in weight percent (wt. %) for the core regions 16, 18 and in the cladding 20.

TABLE 2

| Example | F, wt. % in region 16 | F, wt. % in region 18 | F, wt. % in region 20 |
|---|---|---|---|
| 1 | 0.00 | −1.00 | −1.00 |
| 2 | 0.00 | −0.97 | −0.87 |
| 3 | 0.00 | −1.37 | −0.71 |
| 4 | 0.00 | −1.37 | −0.71 |
| 5 | 0.00 | −1.27 | −0.75 |
| 6 | 0.00 | −1.27 | −1.27 |
| 7 | 0.00 | −0.97 | −0.97 |
| 8 | 0.00 | −1.01 | −0.97 |
| 9 | 0.00 | −1.05 | −1.05 |
| 10 | −0.21 | −1.00 | −1.05 |
| 11 | −0.21 | −1.33 | −0.87 |
| 12 | −0.21 | −1.57 | −0.93 |
| 13 | −0.21 | −1.27 | −1.17 |
| 14 | −0.21 | −1.27 | −1.13 |
| 15 | −0.20 | −1.34 | −1.27 |

Note that in the optical fiber embodiments corresponding to Examples 1-9 of Table 1, $\Delta_{0MAX} = \Delta_{1MAX}$, and the composition of the central core region 14 and the first annular region 16 (up to the elbow section on the graph associated with the transition to the second annular region 18) are identical (see FIGS. 2-10). Thus, because in Examples 1-9, there is no clear second annular core region 18 with a relative refractive index $\Delta_2$, is surrounded by a cladding 20 having refractive index $\Delta_3 = \Delta_2$. In the optical fiber embodiments corresponding to Examples 6, 7 and 9 the compositions of second annular core region 18 and the cladding 20 are identical. However, in other embodiments (see for example the optical fiber parameters of Example 9) the compositions of the second annular region 18 and the cladding 20 may not be identical, i.e. $\Delta_3 \neq \Delta_{2MIN}$ or $\Delta_3 > \Delta_{2MIN}$. In the optical fiber embodiments corresponding to the Examples 6-9, $-0.382\% \leq \Delta_2 \leq -0.292\%$ and $-0.382\% \leq \Delta_3 \leq -0.315\%$. The optical fiber embodiments corresponding to the Examples 10-15 of Table 1 (see FIGS. 11-16) include of a core refractive index profile with a pure silica central core region 14 having a relative refractive index $\Delta_{0MAX} = 0$ surrounded by the first annular core region 16. The first annular region 16 has a relative refractive index $-0.1\% < \Delta_1 \leq 0\%$, and is surrounded by a moat region corresponding to the second annular core region 18 with refractive index $\Delta_{2MIN}$. In optical fiber embodiments corresponding to Examples 10-15 the second annular core region 18, $-0.5\% \leq \Delta_{2MIN} \leq -0.27\%$, for example, $\Delta_{2MIN}$ may be −0.29, −0.3, −0.35, −0.38, −0.4, −0.47, or any value there between. The moat (second annular core region 16) is surrounded by a third annular core region 18 having refractive index $\Delta_3 > \Delta_{2MIN}$. In the optical fiber embodiments corresponding to the Examples 10-15, $-0.38\% \leq \Delta_3 \leq -0.26\%$.

Some of the embodiments of the optical fibers have the following modeled values: fiber cut-off wavelength λc between 1321 nm and 1580 nm, effective area at 1550 nm between 90 μm² $\leq A_{eff} \leq$ 160 μm², dispersion D at 1550 nm between 18 ps/nm/km, and 25 ps/nm/km, and more preferably between 19 ps/nm/km and 23.5 ps/nm/km, and attenuation at 1550 nm less than 0.175 dB/km, for example between 0.165 dB/km and 0.175 dB/km. The exemplary fibers of Table 1 have been modeled and the modeled optical attributes are listed in Tables 2A and 2B.

TABLE 2A

| | Example | | | | | | | |
|---|---|---|---|---|---|---|---|---|
| | 1 | 2 | 3 | 4 | 5 | 6 | 7 | 8 |
| Dispersion at 1310 nm (ps/nm/km) | 2.91 | 3.87 | 5.17 | 5.19 | 4.99 | 4.99 | 2.32 | 2.49 |
| Dispersion Slope at 1310 nm, (ps/nm$^2$/km) | 0.0869 | 0.0888 | 0.0908 | 0.0909 | 0.0906 | 0.0906 | 0.0862 | 0.0862 |
| MFD at 1310 nm, microns | 10.35 | 11.27 | 11.71 | 11.71 | 11.60 | 11.60 | 10.21 | 10.13 |
| Dispersion at 1550 nm (ps/nm/km) | 19.87 | 21.24 | 22.99 | 23.07 | 22.77 | 22.78 | 19.13 | 19.30 |
| Dispersion Slope at 1550 nm, (ps/nm$^2$/km) | 0.0591 | 0.0607 | 0.0622 | 0.0627 | 0.0622 | 0.0623 | 0.0585 | 0.0586 |
| LP11, nm | 1498 | 1497 | 1388 | 1387 | 1411 | 1411 | 1402 | 1352 |
| LP02, nm | 948 | 927 | 896 | 896 | 906 | 906 | 888 | 832 |
| PinArray at 1550 nm, dB | 8.43 | 11.49 | 30.29 | 10.56 | 20.08 | 9.25 | 16.56 | 15.94 |
| LatLoad at 1550 nm, dB | 1.13 | 2.55 | 7.17 | 2.72 | 4.58 | 2.25 | 1.61 | 1.28 |
| Aeff at 1310 nm, microns$^2$ | 86.4 | 105.1 | 120.1 | 120.1 | 116.7 | 116.7 | 83.0 | 81.9 |
| Aeff at 1550 nm, microns$^2$ | 103.75 | 122.02 | 132.33 | 132.23 | 129.54 | 129.52 | 101.71 | 99.76 |
| MFD at 1550 nm, microns | 11.52 | 12.33 | 12.45 | 12.44 | 12.39 | 12.39 | 11.48 | 11.35 |
| Dispersion at 1625 nm (ps/nm/km) | 24.13 | 25.62 | 27.48 | 27.59 | 27.26 | 27.28 | 23.35 | 23.53 |
| Attn at 1550, dB/km | 0.170 | 0.169 | 0.167 | 0.167 | 0.168 | 0.168 | 0.170 | 0.170 |
| Fiber cutoff wavelength, ($\lambda_c$), nm | 1538 | 1537 | 1428 | 1427 | 1451 | 1451 | 1442 | 1392 |
| Lambda_0 ($\lambda_0$), nm | 1276.5 | 1266.5 | 1253.1 | 1253.0 | 1254.9 | 1254.9 | 1283.0 | 1281.2 |

TABLE 2B

| Example | 9 | 10 | 11 | 12 | 13 | 14 | 15 |
|---|---|---|---|---|---|---|---|
| Dispersion at 1310 nm (ps/nm/km) | 2.42 | 2.84 | 5.05 | 5.38 | 3.57 | 4.21 | 3.05 |
| Dispersion Slope at 1310 nm, (ps/nm$^2$/km) | 0.0860 | 0.0873 | 0.0910 | 0.0906 | 0.0870 | 0.0883 | 0.0858 |
| MFD at 1310 nm, microns | 9.91 | 11.17 | 12.81 | 11.64 | 10.22 | 10.78 | 9.64 |
| Dispersion at 1550 nm (ps/nm/km) | 19.16 | 19.95 | 22.98 | 23.20 | 20.55 | 21.49 | 19.76 |
| Dispersion Slope at 1550 nm, (ps/nm$^2$/km) | 0.0583 | 0.0600 | 0.0629 | 0.0625 | 0.0591 | 0.0603 | 0.0581 |
| LP11, nm | 1281 | 1526 | 1536 | 1424 | 1403 | 1506 | 1373 |
| LP02, nm | 793 | 991 | 1006 | 932 | 880 | 947 | 857 |

TABLE 2B-continued

| Example | 9 | 10 | 11 | 12 | 13 | 14 | 15 |
|---|---|---|---|---|---|---|---|
| PinArray at 1550 nm, dB | 18.99 | 20.13 | 14.63 | 9.35 | 8.17 | 5.70 | 5.67 |
| LatLoad at 1550 nm, dB | 1.14 | 4.75 | 25.59 | 2.52 | 0.77 | 0.96 | 0.42 |
| Aeff at 1310 nm, microns$^2$ | 78.43 | 99.03 | 141.02 | 117.86 | 84.89 | 96.06 | 74.89 |
| Aeff at 1550 nm, microns$^2$ | 95.55 | 120.80 | 156.69 | 130.26 | 100.42 | 111.21 | 89.86 |
| MFD at 1550 nm, microns | 11.11 | 12.50 | 13.62 | 12.37 | 11.28 | 11.76 | 10.72 |
| Dispersion at 1625 nm (ps/nm/km) | 23.37 | 24.29 | 27.53 | 27.71 | 24.81 | 25.84 | 23.96 |
| Attn at 1550, dB/km | 0.170 | 0.173 | 0.171 | 0.171 | 0.173 | 0.172 | 0.174 |
| Fiber cutoff wavelength, ($\lambda_c$), nm | 1321 | 1566 | 1576 | 1464 | 1443 | 1546 | 1413 |
| Lambda_0 ($\lambda_0$), nm | 1281.9 | 1277.4 | 1254.5 | 1250.6 | 1268.9 | 1262.3 | 1274.4 |

In Tables 2A and 2B, the terms "Slope 1310" and "Slope 1550" stand for the dispersion slope in units of ps/nm$^2$/km at 1310 nm and 1550 nm wavelength, respectively; "MFD 1310" and "MFD 1550" stand for mode field diameters in microns at 1310 nm 1550 nm wavelength, respectively; "Aeff 1310" and "Aeff 1550" stand for the effective area of the fiber in square microns, at 1310 nm and 1550 nm wavelength, respectively; "D 1625" stands for dispersion in units of ps/nm/km at 1625 nm wavelength, "Attn 1550" stands for attenuation at 1550 nm in dB/km, and the term "Lambda 0" or "$\lambda_0$" stands for zero dispersion wavelength in nm

FIBER EXAMPLES 16-23

Modeled refractive index profiles of two embodiments of the optical fiber 10 of the present invention (Fiber Examples 16 and 17) are shown in FIG. 17. The optical fibers include a core 12 having an effective area of about 110 μm$^2$ at 1550 nm wavelength and a cladding 20 surrounding the core. The core 12 includes a pure silica central core region 14 extending radially outwardly from a centerline to a radius 0 μm≦$r_0$≦2 μm, and a first annular core region 16 that extends to the outer radius $r_1$, wherein $r_1$ is about 5 μm. The second annular region 18 surrounds the first annular region and is down-doped relative to the first annular core region 16. The second annular region extends to the outer radius $r_2$, wherein $r_2$ is about 17 μm in Fiber Example 16 and about 25 μm in Fiber Example 17. Table 3A, below lists optical parameters of Fiber Examples 16 and 17.

TABLE 3A

Optical parameters for Fiber Examples 16 and 17.

| Example | Aeff at 1550 nm, microns$^2$ | Dispersion at 1550 nm (ps/nm/km) | 2 m Cutoff, (nm) | PinArray at 1550 nm (Macrobend), dB | Lat. Load at 1550 nm Microbend (dB/km) | Attn1550 (dB/km) |
|---|---|---|---|---|---|---|
| 16 | 110 | 18.4 | 1400 | 41.99 | 4.98 | <0.170 |
| 17 | 110 | 18.5 | 1426 | 83.24 | 11.47 | <0.170 |

Table 3B, below, lists characteristics of Fiber Examples 18-21 of another illustrative set of fiber embodiments.

TABLE 3B

Fiber Examples 18-21

| Parameter | Example 18 | Example 19 | Example 20 | Example 21 |
|---|---|---|---|---|
| Δo max (%) | 0.0 | 0.0 | 0.0 | 0.0 |
| $\Delta_1$ (%) | 0.0 | 0.0 | 0.0 | 0.0 |
| $r_0$ (microns) | 0.0 | 0.0 | 0.0 | 0.0 |
| Outer radius of the first annular core region $r_1$ (μm) | 5.5 | 6.3 | 6.3 | 6.5 |
| Core Alpha | 100 | 100 | 100 | 100 |
| $\Delta_2$ min (%) | −0.25 | −0.27 | −0.25 | −0.25 |
| $\Delta_3$ min (%) | −0.2 | −0.2 | −0.2 | −0.2 |
| End of the second annular core region $r_2$ (μm) | 27 | 27 | 27 | 27 |
| Dispersion at 1550 nm (ps/nm/km) | 19.4 | 20.8 | 20.6 | 20.8 |
| Dispersion Slope at 1550 nm (ps/nm$^2$/km) | 0.06 | 0.061 | 0.061 | 0.062 |
| Aeff at 1550 nm (μm$^2$) | 119 | 129 | 134 | 138 |
| MFD at 1550 nm (μm) | 12.36 | 12.64 | 12.93 | 13.1 |
| Lat. Load at 1550 nm (dB/km) | 7 | 7 | 11 | 13 |
| Pin Array at 1550 nm (dB) | 107 | 54 | 58 | 51 |
| 2 m Cutoff (nm) | 1134 | 1260 | 1290 | 1337 |
| Attenuation at 1550 nm, (dB/km) | <0.175 | <0.175 | <0.175 | <0.175 |

Figure 18:
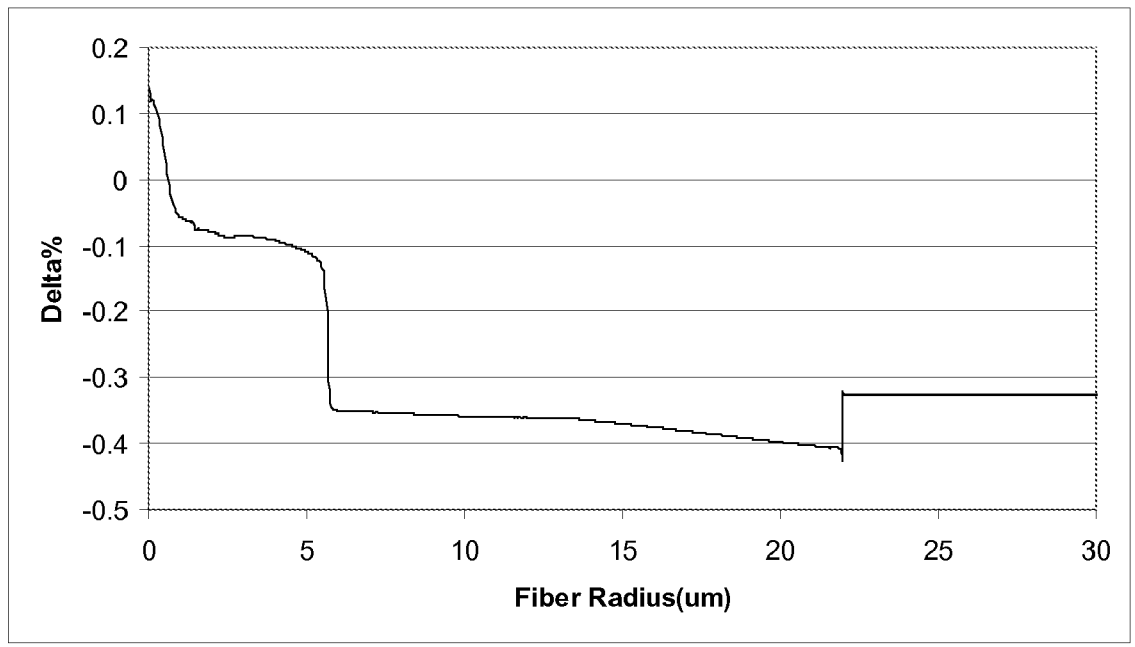

FIG. 18 illustrates a refractive index profile of the (manufactured) Fiber Example 22. This fiber had a measured Aeff of 110 μm² and its attenuation was 0.167 dB/km 1550 nm. The following tables (4a and 4b) provide optical parameters for Fiber Example 22.

TABLE 4a

| MFD at 1550 nm (microns) | Aeff at 1550 nm, (microns²) | Dispersion at 1550 (ps/nm/km) | Dispersion Slope at 1550 nm ((ps/nm²/km) | 2 m Cutoff, (nm) | 1 × 32 mm Macrobend (dB/turn) | Lat. Load at 1550 nm Microbend (dB/km) | Attn at 1550 nm (dB/km) | Attn at 1570 nm (dB/km) |
|---|---|---|---|---|---|---|---|---|
| 12.08 | 116 | 20.47 | 0.06 | 1545 | 0.007 | 0.47 | 0.164 | 0.162 |

TABLE 4b

| Predicted Opticals | |
|---|---|
| PinArray at 1550 nm (dB) | LatLoad at 1550 nm (dB/km) |
| 16.38 | 1.96 |

Figure 19:
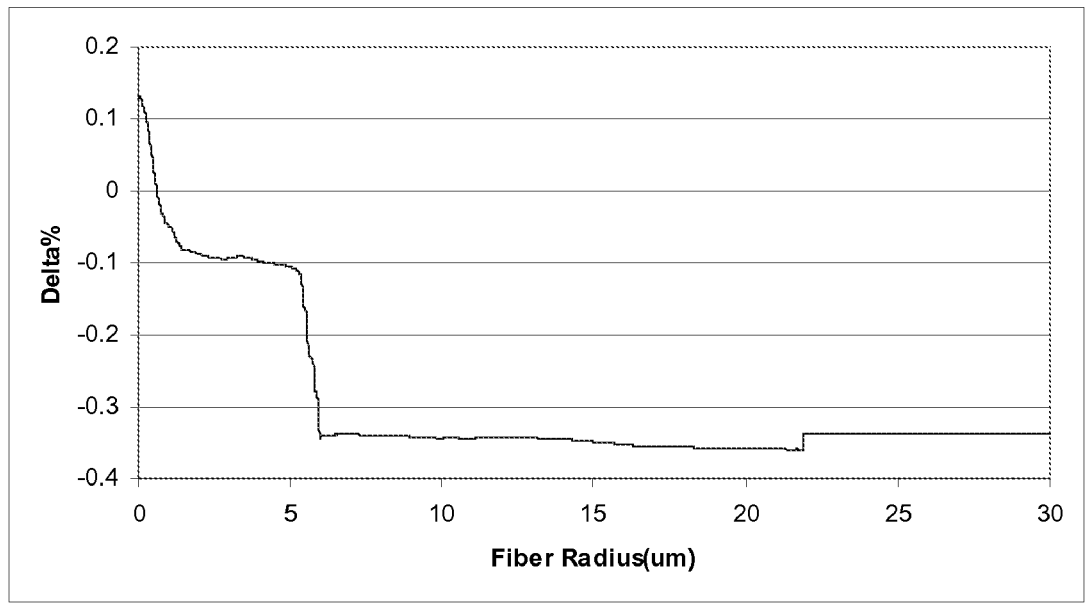

A refractive index profile of the (manufactured) Fiber Example 23 shown in FIG. 19. Profile 1 index profile was manufactured. This fiber has a measured Aeff of 110 μm² and its attenuation is less than 0.17 dB/km 1550 nm. The following tables (5a and 5b) provides optical parameters for Fiber Example 23.

TABLE 5a

| Measured Opticals | | | | | |
|---|---|---|---|---|---|
| MFD at 1550 nm (microns) | Aeff at 1550 nm, (microns²) | Dispersion at 1550 (ps/nm/km) | 2 m Cutoff, (nm) | Lat. Load at 1550 nm (dB/km) | Attn1550 (dB/km) |
| 12.26 | 115.9 | 20 | 1420 | 3.50 | <0.170 |

TABLE 5b

| Predicted Opticals PinArray (dB) |
|---|
| 23.00 |

EXAMPLES 24, 25, AND 26-34

Figure 20:
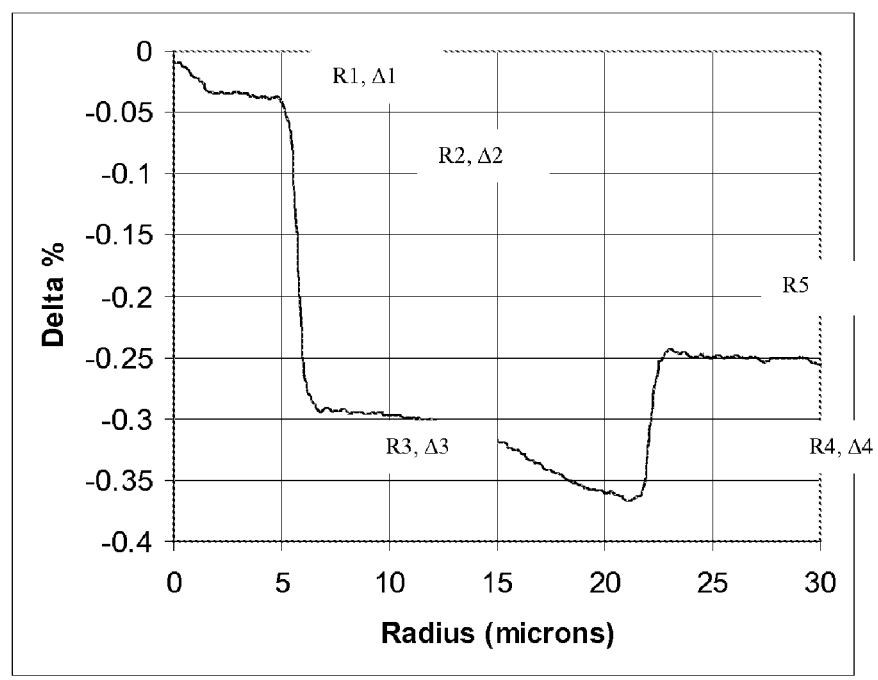
FIG. 20 illustrates measured refractive index profiles of one exemplary fiber embodiment.

Table 6A lists measured characteristics of two additional examples 24 and 25 and FIG. 20, shows the measured refractive index profile of Example 24 fiber. Table 6B summarizes the average, maximum and minimum values of the measured attributes of more than 500 km of optical fiber made according to the invention. The optical fiber embodiments corresponding to Tables 6A and 6B have an alkali-doped first core 12 and fluorine doped second annular region 18. These fibers have an effective area $A_{eff}$ greater than 100 μm², preferably greater than 110 μm², more preferably greater than 115 μm², and even more preferably greater than 120 μm². The cable cutoff of these fiber embodiments is less than 1520 nm, more preferably less than 1500 nm and even more preferably less than 1450 nm Typical attenuation of these fiber embodiments (see for example, Tables 6A and 6B) is less than 0.17 dB/km, more preferably less than 0.16 dB/km, more preferably less than 0.155 dB/km.

TABLE 6A (Fiber Examples 24, 25).

| Example | MFD at 1550 nm, microns | Aeff at 1550 nm, microns² | Dispersion at 1550 nm, ps/nm/km | 22 m CableCutoff (nm) | Attenuation at 1550 nm, dB/km | Microbend loss (dB/km) |
|---|---|---|---|---|---|---|
| 24 | 12.18 | 115.20 | 20.5 | 1420 | 0.1566 | 0.225 |
| 25 | 12.12 | 113.68 | 20.7 | 1450 | 0.1670 | 0.187 |

TABLE 6B

| | MFD at 1550 nm, microns | Aeff at 1550 nm, microns² | 22 m Cable Cutoff (nm) | Dispersion at 1550 nm, ps/nm/km | Attenuation at 1550 nm, dB/km | Length of fibers (km) | PMD (polarisation mode dispersion, (ps per √km)) |
|---|---|---|---|---|---|---|---|
| Average | 12.14 | 114.1 | 1474 | 20.48 | 0.166 | 20.553 | 0.026 |
| Median | 12.15 | 114.4 | 1475 | 20.45 | 0.166 | 16.500 | 0.025 |
| Min | 11.94 | 109.6 | 1421 | 20.04 | 0.153 | 5.800 | 0.019 |

Figure 21:
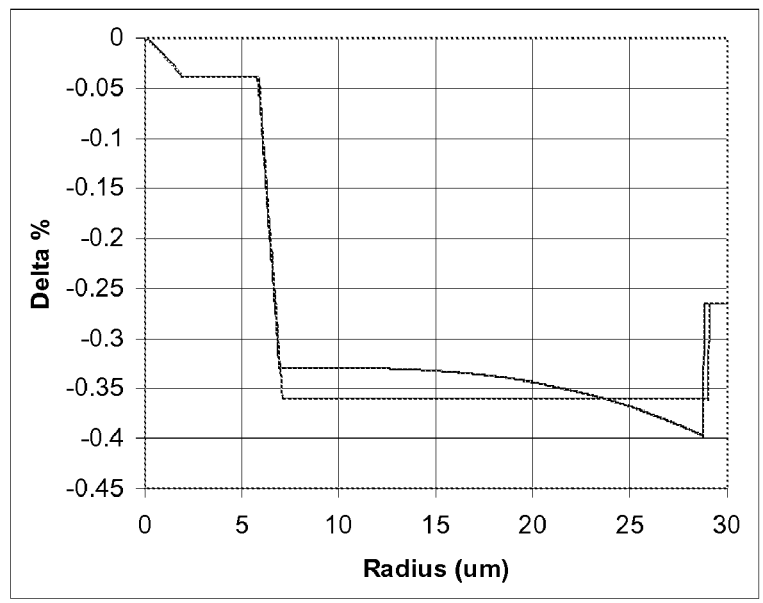
FIG. 21 illustrates refractive index profiles of two additional exemplary fiber embodiments.

Table 7 lists the profile parameters and modeled characteristics of Examples 26-34 of another illustrative set of fiber embodiments. FIG. 21 is a plot of the refractive index profiles of two additional fiber embodiments (29 and 33 in Table 7) of the invention with effective areas greater than 115 µm². The common properties of the exemplary fiber embodiments of Table 7 are: In fiber embodiments with an effective area greater than 115 µm², the optical fiber preferably has a primary coating having a Young's modulus of less than 1.0 Mpa and a secondary coating having a Young's modulus of greater than 1200 Mpa. Examples 26-34 have 1550 attenuation values less than 0.175 dB/km, preferably less than 0.17 dB/km, cable cutoff wavelength <1500 nm, preferably <1450 nm, and an effective area >110 µm², more preferably >120 µm², more preferably >130 µm². The lateral load wire mesh (LLWM) microbending loss is <5 dB, preferably <4 dB, more preferably <3 dB. The LP11 cutoff wavelength is preferably between 1350 and 1500 nm, more preferably between 1380 and 1450 nm.

In the embodiments 26-34, $-0.2\% \leq \Delta_0 = \leq 0.2\%$, $-0.065\% \leq \Delta_1(r=2.5 \ \mu m) \leq 0\%$, $-0.065\% \leq \Delta_{1max} \leq 0.0\%$, $-0.5\% \leq \Delta_{2MIN} \leq -0.27\%$, $-0.4\% \leq \Delta_3 \leq -0.2\%$ (preferably $-0.3\% \leq \Delta_3 \leq -0.2\%$), and $r_1/r_2$ is $0.2 \leq r_1/r_2 \leq 0.3$, and $r_2 < 30$. The volume of the second annular core region is preferably less than $-40\%$-µm², more preferably less than $-50\%$-µm², where the profile volume is calculated by integrating the radial-weighted difference in the index of the second annular core region with respect to the index of the cladding region:

$$V = \int_{r_1}^{r_2} (\Delta_2(r) - \Delta_3) r \, dr$$

A more negative profile volume is desirable for helping confine the optical power in the core, thereby minimizing microbending losses and enabling the combination of large effective area and low attenuation. In embodiments 26-34, the ratio of the radius of the first annular core region to the outer radius of the second core region, r1/r2, is less than 0.4, preferably less than 0.3 and more preferably between 0.2 and 0.3. The microbend figure of merit (MFOM) given in Table 7 is a parameter that captures the relationship between microbend and dispersion $$MFOM = C \frac{(Aeff)^2}{(D)(LP11)}$$

where D is the fiber dispersion at 1550 nm, C is a measure of the microbend reduction by the coating, and LP11 is the theoretical cutoff wavelength of the LP11 mode. The microbend figure of merit (MFOM) is preferably <0.6, more preferably <0.55, and even more preferably between 0.45 and 0.5.

TABLE 7

| | Example | | | | | | | | |
|---|---|---|---|---|---|---|---|---|---|
| | 26 | 27 | 28 | 29 | 30 | 31 | 32 | 33 | 34 |
| $\Delta_0$ (%) | 0.015 | 0.015 | 0.015 | 0.015 | 0.015 | 0.015 | 0.015 | 0.015 | 0.015 |
| $R_0$ (microns) | 2 | 2 | 2 | 2 | 2 | 2 | 2 | 2 | 2 |
| $\Delta_1$ (%) | -0.009 | -0.008 | -0.02 | -0.024 | -0.029 | -0.031 | -0.011 | -0.024 | -0.025 |
| $R_1$ (microns) | 6.2 | 6.21 | 6.4 | 6.42 | 6.64 | 6.76 | 6.45 | 6.52 | 6.73 |
| $\Delta_{2max}$ (%) | -0.324 | -0.31 | -0.323 | -0.314 | -0.32 | -0.32 | -0.354 | -0.345 | -0.344 |
| $R_2$ (microns) | 25.47 | 29.25 | 28.63 | 28.8 | 27.84 | 27.36 | 26.99 | 29.09 | 25.36 |
| $\Delta_{2min}$ (%) | -0.389 | -0.4 | -0.386 | -0.383 | -0.407 | -0.387 | -0.345 | -0.351 | -0.349 |
| $\Delta_3$ (%) | -0.25 | -0.25 | -0.25 | -0.25 | -0.25 | -0.25 | -0.25 | -0.25 | -0.25 |
| Moat Volume (% microns²) | -51.3 | -61.1 | -64.5 | -58.9 | -61.4 | -56.3 | -67.6 | -78.1 | -57.1 |
| R1/R2 | 0.267 | 0.231 | 0.237 | 0.241 | 0.258 | 0.27 | 0.255 | 0.244 | 0.284 |
| Aeff (microns²) | 116.6 | 120.2 | 123.2 | 125.5 | 130.1 | 132.8 | 118.5 | 122.3 | 128.1 |
| MFOM | 0.468 | 0.485 | 0.512 | 0.532 | 0.557 | 0.574 | 0.464 | 0.505 | 0.531 |
| Lat. Load at 1550 nm (dB/km) | 1.84 | 1.88 | 2.54 | 3.15 | 3.95 | 4.96 | 1.67 | 2.45 | 3.56 |
| Dispersion at 1550 (ps/nm/km) | 21.09 | 21.04 | 21.24 | 21.13 | 21.36 | 21.41 | 21.63 | 21.49 | 21.68 |
| Dispersion Slope at 1550 nm (ps/nm²/km) | 0.0617 | 0.0617 | 0.0619 | 0.0619 | 0.0622 | 0.0623 | 0.0621 | 0.0621 | 0.0624 |
| Pin Array at 1550 nm (dB) | 14.1 | 11.26 | 14.47 | 16.27 | 15.64 | 16.69 | 11.23 | 15.32 | 15.25 |
| LP11 (microns) | 1.379 | 1.416 | 1.396 | 1.4 | 1.422 | 1.435 | 1.399 | 1.377 | 1.426 |

Table 8 gives the measured properties of two optical fibers made according to Example 29 in Table 7. The optical fiber embodiments corresponding to Table 7 have an alkali-doped first core 12 and fluorine doped second annular region 18. These fibers have an effective area $A_{eff}$ greater than 115 µm², preferably greater than 120 µm², and more preferably greater than 125 µm². The cable cutoff of these fiber embodiments is less than 1520 nm, more preferably less than 1500 nm and even more preferably less than 1450 nm. Typical attenuation of these fiber embodiments is less than 0.175 dB/km, more preferably less than 0.17 dB/km.

TABLE 7

(Fiber Example 29).

| Example | MFD at 1550 nm, microns | Aeff at 1550 nm, microns² | Dispersion at 1550 nm, ps/nm/km | 22 m CableCutoff (nm) | Attenuation at 1550 nm, dB/km | 1 × 20 mm macrobend loss (dB/Turn) |
| --- | --- | --- | --- | --- | --- | --- |
| 35 | 12.65 | 127.9 | 20.3 | 1415 | 0.166 | 0.15 |
| 36 | 12.38 | 125.0 | N/A | 1383 | 0.171 | N/A |

Figure 22:
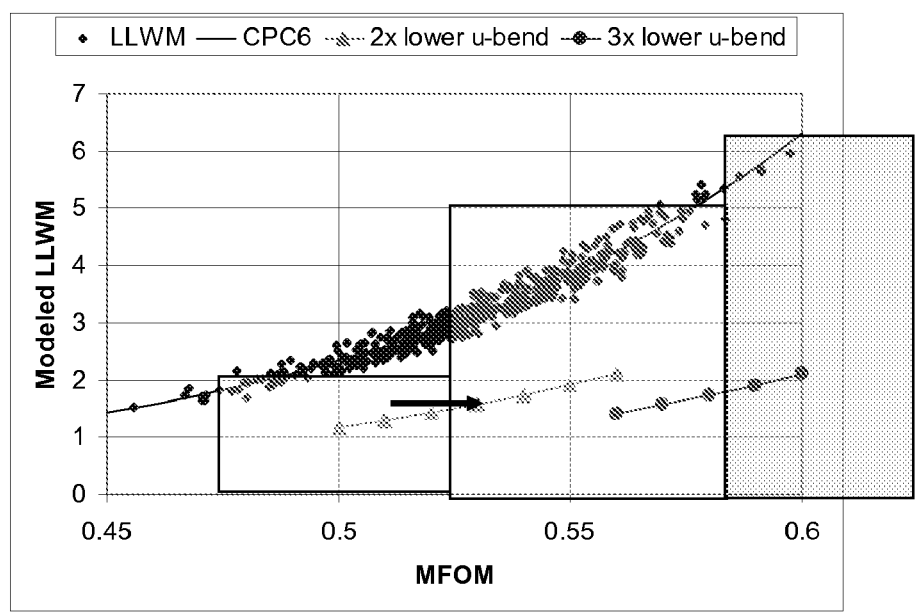
FIG. 22 illustrates modeled LLWM versus the Microbend FOM for fibers in the range of the examples given in Table 4.

The dependence of the modeled LLWM on the MFOM is plotted in FIG. 22. There is excellent correlation between these two parameters, so this new metric is an excellent way for evaluating the microbend sensitivity of a given fiber design. It also explains why lower dispersion fibers have higher microbend sensitivity. In FIG. 22, the upper curve illustrates that low attenuation fibers made with standard coating have acceptable microbending losses (LLWM<2 dB) for microbend figure of merit values up to about 0.45. This limits the fiber effective area to approximately 115 µm². The lower curve in FIG. 22 illustrates that a coating that provide more microbending resistance enables larger MFOM values, and this enables the maximum LLWM value to be extended to approximately 4 dB, which in turn enables significantly larger effective areas. Low attenuation optical fibers with effective areas as large as 140 µm² are possible through the combination of the profile designs in Table 7 and a coating with superior microbend resistance.

We have found that a certain combination of primary and secondary coatings remarkably improve microbend performance, and therefore overall attenuation, enabling the effective area of the fiber to be increased to ≧115 µm², preferably ≧120 µm² and even more preferably ≧130 µm². An optical fiber with effective area of at least 115 µm² preferably comprises a primary coating P that is in contact with and surrounds the cladding 20. The primary coating P has a Young's modulus of less than 1.0 MPa, preferably less than 0.9 MPa, and in preferred embodiments not more than 0.8 MPa. This optical fiber further comprises a secondary coating S contacting and surrounding the primary coating P. The secondary coating S preferably has a Young's modulus of greater than 1200 MPa, and more preferably greater than 1400 MPa.

As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 µm) and 0.004" (102 µm) in thickness and about 1.3 cm in width, with a gauge length of 5.1 cm, and a test speed of 2.5 cm/min.

In the exemplary embodiments the primary coating P desirably has a glass transition temperature that is lower than the lowest projected use temperature of the coated optical fiber.

In some embodiments, the primary coating P has a glass transition temperature of less than −25° C., more preferably less than −30° C. Primary coating P desirably has a higher refractive index than the cladding of the optical fiber in order to allow it to strip errant optical signals away from the core of optical fiber. For example, a transmission optical fiber has refractive index values at a wavelength of 1550 nm for the core and cladding of 1.447 and 1.436, respectively; thus it is desirable that the refractive index of primary coating P be greater than 1.44 at 1550 nm. The primary coating P should maintain adequate adhesion to the glass fiber during thermal and hydrolytic aging, yet be strippable therefrom for splicing purposes. The primary coating P typically has a thickness in the range of 25-50 µm (e.g., about 32.5 µm) and can be applied to the optical fiber as a liquid and cured.

The primary coating P is preferably a cured product of a primary curable composition including an oligomer and at least one monomer. The primary curable compositions used in forming the primary coatings may also include photoinitiators.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical waveguide fiber comprising:
 (i) a Ge free core having an effective area of 100.4 µm² to 160 µm², at a 1550 nm wavelength, and α value $12 \leq \alpha \leq 200$, said core comprising:
  (a) a central core region extending radially outwardly from a centerline to a radius $r_0$, and having a relative refractive index percent profile $\Delta_0(r)$ in % measured relative to pure silica, wherein $-0.1\% \leq \Delta_0(r) \leq 0.1\%$, wherein the central core region has a maximum relative refractive index percent, $\Delta_{0MAX}$;
  (b) a first annular core region surrounding and directly adjacent to the central core region and extending to an outer radius $r_1$, wherein $4.8 \ \mu m \leq r_1 \leq 10 \ \mu m$, and having a relative refractive index percent profile, $\Delta_1(r)$ in % measured relative to pure silica, and a minimum relative refractive index, $\Delta_{2MIN}$, and the relative refractive index measured at a radius r=2.5 µm being:

$-0.15 \leq \Delta_1(r=2.5 \ \mu m) \leq 0$ and $\Delta_{0MAX} \geq \Delta_1(r=2.5 \ \mu m);$ (c) a fluorine doped second annular region surrounding and directly adjacent to the first annular core region and extending to a radius $13 \ \mu m \leq r_2 \leq 30 \ \mu m$ and having a negative relative refractive index percent profile, $\Delta_2(r)$ in %, measured relative to pure silica, with a minimum relative refractive index percent $\Delta_{2MIN}$ being:

$\Delta_{2MIN} < \Delta_1(r=2.5 \ \mu m)$ and $-0.5\% \leq \Delta_{2MIN} \leq -0.27\%;$ (ii) a cladding surrounding the core and having a relative refractive index percent $\Delta_c(r)$ in % measured relative to pure silica, and $\Delta_c(r)=\Delta_{2MIN}\pm 0.3\%$;

wherein the relative refractive index profile of the optical fiber is selected to provide attenuation of less than 0.172 dB/km at the 1550 nm wavelength.

2. The optical waveguide fiber according to claim 1 wherein at least a portion of the central core region is made of pure silica.

3. The optical waveguide fiber according to claim 1 wherein $-0.5\% < \Delta_{2MIN} < -0.25\%$.

4. The optical waveguide fiber according to claim 1, wherein $-0.1\% \leq \Delta_1(r=2.5) \leq 0\%$.

5. The optical waveguide fiber according to claim 1, wherein $\Delta_0=0$; $-0.07\% \leq \Delta_1(r=2.5\ \mu m) \leq 0\%$, $-0.5\% \leq \Delta_{2MIN} \leq -0.27\%$, $r_2/r_1$ is $2.17 \leq r_2/r_1 \leq 5.7$, and $r_2 \leq 2.6$.

6. The optical waveguide fiber according to claim 1, wherein said fiber is characterized by dispersion D at a wavelength of 1550 nm, and $18 \leq D \leq 25$ ps/nm/km.

7. The optical waveguide fiber according to claim 1, wherein said fiber is characterized by dispersion D at a wavelength of 1550 nm, and $19 \leq D \leq 23$ ps/nm/km.

8. The optical waveguide fiber according to claim 1, wherein said fiber is characterized by a zero dispersion wavelength $\lambda_0$, and 1245 nm $\leq \lambda_0 \leq$ 1290 nm.

9. The optical waveguide fiber according to claim 1, wherein said fiber has macrobend loss at 1550 nm of less than 10 dB/m for 20 turns on 20 mm diameter mandrel.

10. The optical waveguide fiber according to claim 1, wherein said fluorine doped second annular region has 0.01% wt % to 1.6 wt % fluorine.

11. The optical waveguide fiber according to claim 1, wherein:
(i) said Ge free core has an effective area between 101.7 $\mu m^2$ and 160 $\mu m^2$; and (ii) a fluorine doped second annular region has 0.07% wt % to 1.6 wt % fluorine.

12. The optical waveguide fiber according to claim 1, wherein said fiber has more than 500 ppm of Chlorine in said core and more than 10000 ppm of chlorine in the cladding.

13. An optical waveguide fiber comprising:
(i) a Ge free core having an effective area at 1550 nm wavelength between 100 $\mu m^2$ and 160 $\mu m^2$, and $\alpha$ value $12 \leq \alpha \leq 25$, said core comprising:
  (a) a central core region extending radially outwardly from a centerline to a radius 0 $\mu m \leq r_0 \leq 2\ \mu m$, and having a relative refractive index percent profile $\Delta_0(r)$ in % measured relative to pure silica, wherein $-0.1\% \leq \Delta_0(r) \leq 0.1\%$, wherein the central core region has a maximum relative refractive index percent, $\Delta_{0MAX}$;
  (b) a first annular core region surrounding and directly adjacent to the central core region and extending to an outer radius $r_1$, wherein 4.8 $\mu m \leq r_1 \leq 10\ \mu m$, and having a relative refractive index percent profile, $\Delta_1(r)$ in % measured relative to pure silica, and a minimum relative refractive index, $\Delta_{2MIN}$, and the relative refractive index measured at a radius r=2.5 $\mu m$ being:

$-0.07\% \leq \Delta_1(r=2.5\ \mu m) \leq 0\%$ and $\Delta_{0MAX} \geq \Delta_1(r=2.5\ \mu m)$;

(c) a fluorine doped second annular region surrounding and directly adjacent to the first annular core region and extending to a radius 13 $\mu m \leq r_2 \leq 30\ \mu m$ and having a negative relative refractive index percent profile, $\Delta_2(r)$ in %, measured relative to pure silica, with a minimum relative refractive index percent $\Delta_{2MIN}$ being:

$\Delta_{2MIN} < \Delta_1(r=2.5\ \mu m)$;

(ii) a cladding surrounding the core and having a relative refractive index percent $\Delta_c(r)$ in % measured relative to pure silica, and $\Delta_c(r)=\Delta_{2MIN}\pm 0.3\%$;

wherein the relative refractive index profile of the optical fiber is selected to provide attenuation between 0.15 dB/km and 0.175 dB/km at 1550 nm, wherein $\Delta_0=0$; $-0.38\% \leq \Delta_{2MIN} \leq -0.27\%$, $r_2/r_1$ is $2.17 \leq r_2/r_1 \leq 5.7$, and $r_2 \leq 2.6$, said optical waveguide fiber has dispersion D at a wavelength of 1550 nm is 18 ps/nm/km $\leq D \leq 25$ ps/nm/km, 1245 nm $\leq \lambda_0 \leq$ 1290 nm and macrobend loss at 1550 nm of less than 10 dB/m for 20 turns on 20 mm diameter mandrel.

14. The optical waveguide fiber according to claim 1, wherein (i) said fluorine doped second annular region has 0.01% to 1.6 wt % fluorine and (ii) said fiber has more than 500 ppm of chlorine in the core and (iii) more than 10000 ppm of chlorine in the cladding.

15. An optical waveguide fiber comprising:
(i) a Ge free core having an effective area Aeff at 1550 nm of 100.4 $\mu m^2 \leq$ Aeff $\leq$ 160 $\mu m^2$, and $\alpha$ value $12 \leq \alpha \leq 25$, said core comprising:
  (a) a central core region extending radially outwardly from a centerline to a radius 0 $\mu m \leq r_0 \leq 2\ \mu m$, and having a relative refractive index percent profile $\Delta_0(r)$ in % measured relative to pure silica, wherein $-0.1\% \leq \Delta_0(r) \leq 0.1\%$, wherein the central core region has a maximum relative refractive index percent, $\Delta_{0MAX}$;
  (b) a first annular core region surrounding and directly adjacent to the central core region and extending to an outer radius $r_1$, wherein 4.8 $\mu m \leq r_1 \leq 10\ \mu m$, and having a relative refractive index percent profile, $\Delta_1(r)$ in % measured relative to pure silica, and a minimum relative refractive index, $\Delta_{2MIN}$, and the relative refractive index measured at a radius r=2.5 $\mu m$ being:

$-0.15 \leq \Delta_1(r=2.5\ \mu m) \leq 0$ and $\Delta_{0MAX} \geq \Delta_1(r=2.5\ \mu m)$;

(c) a fluorine doped second annular region surrounding and directly adjacent to the first annular core region and extending to a radius 13 $\mu m \leq r_2 \leq 30\ \mu m$ and having a negative relative refractive index percent profile, $\Delta_2(r)$ in %, measured relative to pure silica, with a minimum relative refractive index percent $\Delta_{2MIN}$ being:

$\Delta_{2MIN} < \Delta_1(r=2.5\ \mu m)$ and $-0.5\% \leq \Delta_{2MIN} \leq -0.27\%$ (ii) a cladding surrounding the core and having a relative refractive index percent $\Delta_c(r)$ in % measured relative to pure silica, and $\Delta_c(r)=\Delta_{2MIN}\pm 0.3\%$.

16. The optical waveguide fiber according to claim 15, wherein said fiber has an effective area Aeff>101.7 $\mu m^2$.

17. The optical waveguide fiber according to claim 16, wherein said fiber has an effective area Aeff>110 $\mu m^2$.

18. The optical waveguide fiber according to claim 15, wherein the relative refractive index profile of the optical fiber is structured to provide attenuation of no more than 0.16 dB/km at the 1550 nm wavelength.

19. The optical waveguide fiber according to claim 18, the relative refractive index profile of the optical fiber is structured to provide attenuation of no more than 0.155 dB/km at the 1550 nm wavelength.

20. The optical waveguide fiber according to claim 15, wherein the relative refractive index profile of the optical fiber is structured to provide (i) attenuation of no more than 0.16 dB/km at the 1550 nm wavelength and (ii) the cable cut wavelength less than 1520 nm.

21. The optical waveguide fiber according to claim 20, wherein the cable cut wavelength not greater than 1450 nm.

22. The optical waveguide fiber according to claim 15, wherein said fiber has an effective area Aeff>120 μm² and the relative refractive index profile of the optical fiber is structured to provide dispersion that is not higher than 21 ps/nm/km.

23. The optical waveguide fiber according to claim 1 wherein at least a portion of the core comprises an alkali.

24. The optical waveguide fiber according to claim 23 wherein the alkali comprises Na, K or Rb.

25. The optical waveguide fiber according to claim 23 wherein the alkali comprises K in the range of 20 ppm to 1000 ppm by weight.

26. The optical waveguide fiber according to claim 13 wherein at least a portion of the core comprises an alkali.

27. The optical waveguide fiber according to claim 26 wherein the alkali comprises Na, K or Rb.

28. The optical waveguide fiber according to claim 26 wherein the alkali comprises K in the range of 20 ppm to 1000 ppm by weight.

29. The optical waveguide fiber according to claim 15 wherein at least a portion of the core comprises an alkali.

30. The optical waveguide fiber according to claim 29 wherein the alkali comprises Na, K or Rb.

31. The optical waveguide fiber according to claim 29 wherein the alkali comprises K in the range of 20 ppm to 1000 ppm by weight.

32. The optical waveguide fiber according to claim 1, said fiber further comprising:
   (i) a primary coating having a Young's modulus of less than 1.0 Mpa;
   (ii) a secondary coating having a Young's modulus of greater than 1200 Mpa; and wherein said fiber has an effective area greater than 115 μm².

33. The optical waveguide fiber according to claim 1, said fiber having dispersion D of no more than 21 ps/nm/km at 1550 nm wavelength.

34. The optical waveguide fiber according to claim 21, said fiber having dispersion D of no more than 20 ps/nm/km at 1550 nm wavelength.

* * * * *